Nov. 8, 1960 S. STOKLAND 2,959,142
SUPPORT STRUCTURES FOR AGRICULTURAL IMPLEMENTS OR MACHINES
Filed May 5, 1958
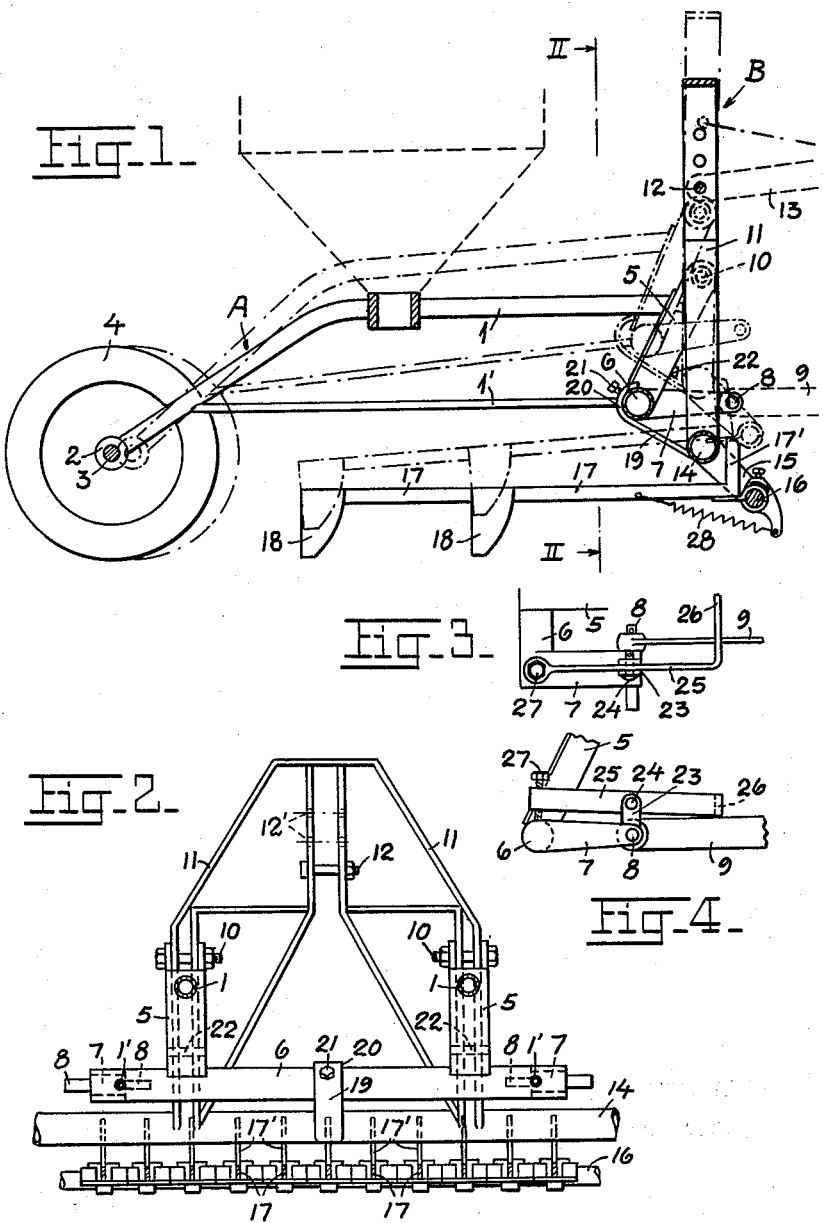
Inventor
Sigmund Stokland
By Kurt Kelman
His Agent United States Patent Office 2,959,142
Patented Nov. 8, 1960

2,959,142
SUPPORT STRUCTURES FOR AGRICULTURAL IMPLEMENTS OR MACHINES

Sigmund Stokland, Nygards Alle 3, Oslo, Norway

Filed May 5, 1958, Ser. No. 733,018

Claims priority, application Norway May 7, 1957

8 Claims. (Cl. 111—59)

This invention relates to support structures for agricultural implements or machines which are connectable to and adapted to be lifted by the hitch linkage of a tractor or the like. More particularly, the invention relates to a support structure having a front end connectable with the hitch linkage, and a rear end adapted to carry rotatable ground wheels.

The support structure is particularly suitable for, though not exclusively limited to, the used in connection with seed drilling machines.

It is already known to provide the rear ends of support structures with ground wheels which may serve as driving wheels for the dispensing mechanism of a seed drilling machine mounted on the support structure, the front end of the structure being connectable to the hydraulically operated hitch linkage of a tractor, the spring loaded drills or planting plows of the drilling machine being secured for limited movement to a transversely extending support member of the support structure in such a way that said drills or plows, after the support structure has been lifted a certain distance, are locked to the same and are thereby moved upwardly from the ground.

A disadvantage of such prior structures is in that, owing to the rigid connection between the component parts of the support structure and the necessarily limited free movement of the drills or plows, the ground wheels at the rear end of the support structure are immediately moved above the ground when the structure is lifted while the drills or plows are lifted only after they have reached the limit of their free downward movement.

During the operation of such machines, it is necessary from time to time to release from the drills or plows any straw, roots or similar matter which has accumulated at the leading edges of the drills or plows. This can only be effected by lifting the drills a short distance above the ground. During such lifting, however, sowing is interrupted because the ground wheels have been lifted before actual lifting of the drills. Sowing can only be started again some time after the drills have been returned into operative position, so that an undesired break in sowing arises.

According to the present invention, there is provided a support structure for agricultural implements or machines which is connectable to the hitch linkage of a tractor or the like and is adapted to be lifted by means of the hitch linkage, the support structure comprising a first frame part which rotatably carries at least one groundwheel at the rear end thereof, and whose front end is connectable with the lower links of the hitch linkage, there being a second frame part connectable to the upper link of said hitch linkage, and means for limiting the movements of both frame parts relative to one another, the arrangement being such that when the support structure is to be lifted by means of the hitch linkage, the second frame part is moved upwardly relative to the first frame part to an extent determined by the limiting means, the parts being lifted together as a unit upon the termination of relative movement of one part with respect to the other part.

For a better understanding of the present invention and to show how the same may be carried into effect, reference will now be made to the accompanying drawing in which like reference numerals indicate like parts and in which:

Figure 1 is a diagrammatic side elevational view, partly in section, of a support structure for a seed drilling machine, Figure 2 is a rear elevational view of the support structure, partly in section taken on the line II—II of Figure 1, in which certain parts are not shown, Figure 3 is a fragmentary plan view of a detail of the support structure shown in Figures 1 and 2, and Figure 4 is a side elevational view of the detail shown in Figure 3.

The support structure incorporates two frame parts A and B which are connected together for limited movement relative to one another.

The frame part A has horizontally extending members 1 whose rear end portions extend downwardly and carry bearings 2 for supporting a cross shaft 3 on which ground wheels 4 are mounted for rotation.

A seed container having a dispensing mechanism and supply tubes leading to respective drills or planting plows of the type disclosed, for example, in my copending application Serial No. 575,446, filed April 2, 1956, now Patent Number 2,874,878, may also be mounted on the part A. Such seed dispensing means do not constitute part of this invention and will not be further described here. The dispensing mechanism may be driven in a known manner from the wheels 4 or from the shaft 3.

To the front ends of the frame members 1 are secured arms 5 which are inclined downwardly and rearwardly, the lower ends of the arms 5 being interconnected by a cross tube 6 which is also connected to the respective frame members 1 of the part A by means of struts 1'. The ends of cross tube 6 which project beyond the arms 5 carry transverse forwardly projecting arms 7 each of which carries a stud 8 to which the end of a lower hydraulically operated hitch link 9 of the tractor which is to draw the drilling machine can be pivotally connected. The upper ends of the arms 5 are pivotally connected by means of bolts 10 to the part B which comprises an upwardly extending frame 11 having disposed approximately at the centers of the sides thereof, openings for the reception of bolts 10. The upper part of the frame 11 is formed with openings 12' adapted to receive a pivot bolt 12 to which the single top link 13 of the hitch links of the tractor can be connected.

The lower end of the frame 11 carries a cross tube 14 having forwardly and downwardly projecting arms 15 which support a shaft 16 parallel with the cross tube 14. Levers 17 are pivotally supported on the shaft 16 and are biased by springs 28 which act in such a way as to urge the levers in counterclockwise direction. On the rear free ends of the levers 17 are disposed drills or planting plows 18 which may be of any desired type. Near each pivot connecting a lever 17 to the shaft 16, there extends upwardly an angled portion 17' adapted to co-operate with the cross tube 14 so as to limit the pivotal movement of the levers 17 in the counterclockwise direction when the machine is lifted.

Alternatively, the drills or planting plows of the machine may be mounted for limited vertical movement with respect to a support member connected to the part B.

In order to limit rotational movements between the parts A and B as the machine is lowered towards the ground, a stop arm 19 is secured to the tube 14, which arm 19 has a semicircular end portion 20 adapted to receive the cross tube 6 so as to arrest the rotational movement of the part B, as shown in Figure 1; one or more threaded openings may be formed in the end portion 20 of the arm 19 for the reception of a stop screw 21 by means of which the distance which the tube 6 can move may be regulated.

When the machine is to be raised from the operative position shown in full lines in Figure 1, the hitch links 9 are lifted by means of the hydraulic power lift of the tractor. During the upward movement of links 9 the front end of the part A is lifted together with the part B which latter, owing to the control exercised by the top link 13, rotates about the bolts 10. The levers 17, which carry the drills 18, then rotate about the shaft 16 until the angle portions 17' come into abutment with the tube 14 thus terminating the rotary movement of the levers 17 so that the levers 17 are raised, whereby the drills 18 are lifted above the ground.

The components of the support structure thus occupy the position shown in broken lines in Figure 1, the rotational movement between the parts A and B being arrested, as will be hereinafter described, so that both parts can be moved as a unit to the upper limit of their upward movement. The rotational movement between the parts A and B may be arrested by causing the tube 6 to engage the frame 11, or by providing abutment pieces 22, as shown in the drawing, on the arms 5 adapted to bear against the rear edges of the side portions of the frame 11. The abutment pieces 22 may be adjustable.

When the components of the support structure is lowered again, the part A rotates about the bolts 10 as the part B is lowered. The drills 18 come into contact with the ground whereby the levers 17 are caused to rotate about the shaft 16 against the action of the springs 28 so that the drills penetrate into the ground, the extent of such penetration being limited by the engagement of the cross tube 6 with the end portion 20 of the arm 19.

In the position just described the parts A and B are again disposed as shown in full lines in Figure 1, the rotational movement between the parts A and B being arrested. Owing to the pivotal connection between the parts A and B the drills or planting plows 18 perform, when the machine is being lifted, an arc-like movement in the upward and rearward directions. The drills thus perform a similar movement in the downward and forward direction as the machine is lowered. The drills, upon their engagement with the ground, are thus forwardly directed so that they are not filled with soil as is often the case with drills supported in known manner since such drills are usually rearwardly directed when they are being lowered. The novel support thus enables the drills or planting plows to be lowered while the machine is stationary without the drills being clogged with soil.

The rotational movement between the parts A and B further ensures that the angle portions 17' of the levers 17 make early engagement with the cross tube 14 when the machine is being raised so as to limit the downward movement of the levers 17 whereby the levers do not exert a pull upon the supply tubes leading to the drills.

It will be apparent that the drills or planting plows 18 can be lifted above the ground a distance sufficient that matter, for example straws or roots, adhering to the drills is released without stopping the drive of the dispensing mechanism from the ground wheel or wheels 4.

The limitation of the rotation of the parts A and B with respect to one another when the machine is being lowered may also be effected by providing the part A with forwardly directed extensions adapted to bear against the upper edges of the hitch links 9 so as to arrest further rotational movement between links 9 and the part A. In such cases, the stop arm 19 may be dispensed with. An arrangement of this type is shown in Figures 3 and 4.

The outer ends of the arms 7, which project forwardly from the tube 6 and carry the studs 8 for the links 9, are provided on the upper sides thereof with brackets 23 carrying bolts 24 on which are pivotally secured arms 25 of a U-shaped member, the cross portion or base 26 of which is directed forwardly so as to lie above the links 9 as shown. Openings in the arms 25 of the U-shaped member adapted to receive bolts 24, are disposed approximately in the center of each arm 25. The free rear ends of the arms 25 are located above the tube 6, and are provided with vertical adjusting screws 27 by means of which the height of the base 26 of the U-shaped member 25 with respect to the studs 8 for the links 9 can be regulated. When the machine is being lowered, the downward movement of the part A is arrested when the base 26 bears against the upper edges of the links 9 thus providing a rigid connection between the links 9 and the part A. Because the weight of the machine is thus borne by the tractor through leverage, an increased load is exerted on the rear wheels of the tractor, a factor which is of importance when the tractor is to be driven over uneven ground.

What I claim is:

1. In combination with a tractor having upper and lower hitch link means, a support structure comprising a substantially horizontal first frame part having a front and a rear end, ground wheel means rotatably mounted at the rear end of said frame part, first arms rigidly connected to the front end of said frame part, each arm having an upper end and a lower end, a substantially vertical second frame part having a lower end, pivot means for articulately connecting the second frame part with the upper ends of said arms, a transverse cross member connected to the lower ends of said arms, forwardly extending second arms fixed to said cross member and comprising means articulately connected to said lower hitch link means, means located above said pivot means for articulately connecting the second frame part to the upper hitch link means, implement supporting means connected to the lower end of said second frame part, and means for limiting movements of the first frame part with respect to the second frame part in a direction to lower the ground wheel means whereby the first and second frame parts may be lifted as a unit by the hitch link means when said limiting means becomes operative.

2. A support structure as set forth in claim 1, wherein said limiting means comprises abutment members carried by said first arms and engaging with the second frame part when the frame parts are lifted by said hitch link means.

3. A support structure as set forth in claim 1, further comprising a hook-shaped member connected to the second frame part and adapted to engage with said cross member for limiting movements of the first frame part with respect to the second frame part in a direction to lift the ground wheel means.

4. A support structure as set forth in claim 1, wherein said limiting means comprises at least one substantially U-shaped member connected to one of said second arms and abutting against said lower hitch link means when the latter is moved with respect to said one second arm in one direction.

5. A support structure as set forth in claim 4, wherein the U-shaped member is pivotally connected to said one second arm and further comprising means for adjusting the position of the U-shaped member with respect to said one second arm.

6. A support structure as set forth in claim 1, wherein said implement supporting means comprises a second transverse cross member connected to the lower end of said second frame part, third arms connected to the second cross member and extending forwardly and downwardly therefrom, a transverse shaft supported by said third arms, and a plurality of substantially horizontal levers each having a forward end articulately connected to said shaft and extending rearwardly therefrom in a direction toward said ground wheel means.

7. A support structure as set forth in claim 6, wherein each lever comprises a substantially vertical angle portion which abuts against the second cross member when the frame parts are lifted for limiting pivotal movements of the levers about said shaft.

8. A support structure as set forth in claim 7, further comprising spring means connected with at least one lever for constantly biasing same in a direction to maintain said angle portions in abutment with the second cross member.

References Cited in the file of this patent
UNITED STATES PATENTS

| | | |
|---|---|---|
| 2,363,749 | Rude | Nov. 28, 1944 |
| 2,551,870 | Bridger | May 8, 1951 |
| 2,751,834 | Hines et al. | June 26, 1956 |
| 2,790,366 | McKinzie | Apr. 30, 1957 |